United States Patent [19]

Martin

[11] 4,446,731

[45] May 8, 1984

[54] CONTAINER HAVING SIGHT GLASS

[75] Inventor: Keith S. Martin, Stafford, England

[73] Assignee: Scovill Inc., Waterbury, Conn.

[21] Appl. No.: 299,411

[22] Filed: Sep. 4, 1981

[30] Foreign Application Priority Data

Sep. 5, 1980 [GB] United Kingdom ................. 8028833

[51] Int. Cl.³ .......................................... G01F 23/02
[52] U.S. Cl. .................................................... 73/334
[58] Field of Search .................. 73/330, 334, 323, 427

[56] References Cited

U.S. PATENT DOCUMENTS 1,063,604 6/1913 Scalley .................................. 73/330

FOREIGN PATENT DOCUMENTS 230185 4/1910 Fed. Rep. of Germany ........ 73/334
6443 of 1912 United Kingdom .................. 73/334

Primary Examiner—Charles Frankfort
Assistant Examiner—Denis E. Corr
Attorney, Agent, or Firm—Dallett Hoopes

[57] ABSTRACT

A fluid container, e.g. in an air filter or lubricator, has a metal bowl with a sight glass comprising an elongate light-transmitting member of longitudinally tapered form. The sight glass member is slidable into a complementary tapered slot or recess defined by a flange integral with the bowl and overlying a flat wall portion provided with apertures to the main volume of the bowl and the space between said wall portion and the member adjacent top and bottom regions of the member respectively.

4 Claims, 5 Drawing Figures

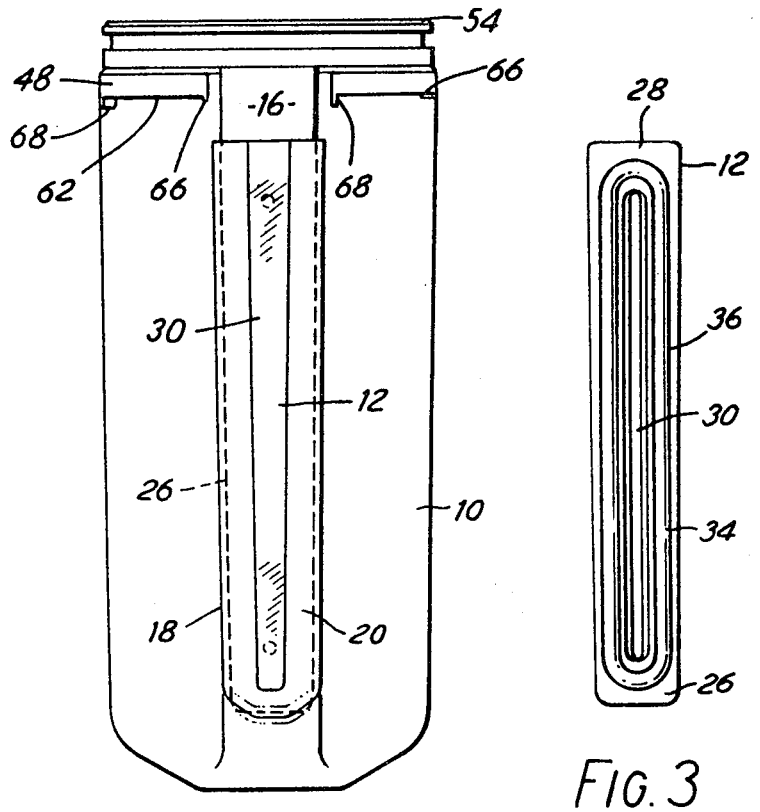
FIG. 2
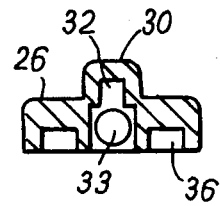
FIG. 3
FIG. 3a
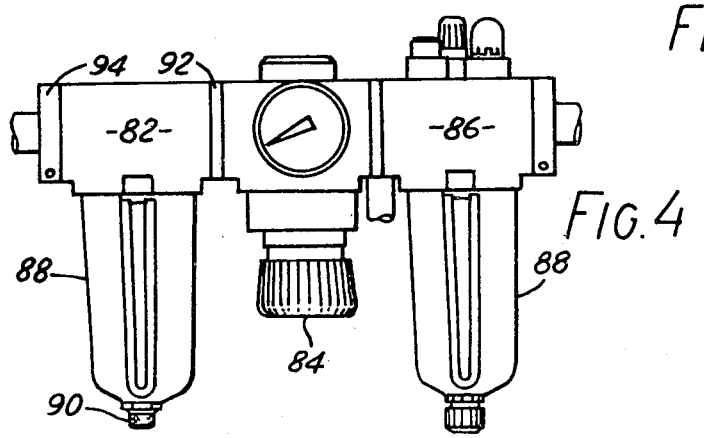
FIG. 4

CONTAINER HAVING SIGHT GLASS

BACKGROUND OF THE INVENTION

This invention relates to fluid handling devices, such as fluid filters and lubricators, of the kind comprising a dependent liquid container. In a filter this container will serve as a collecting bowl in which the liquid separated from a throughflow is deposited to be drained off, as the separation of liquid from a pressure air supply. In a lubricator the container will provide a reservoir of liquid lubricant to be taken up by a pressure gas throughflow.

Although it is obviously desirable to make such containers from a transparent material so that the level of liquid can be readily seen, the use of glass is often unacceptable because of its brittleness. In recent years plastics materials, in particular polycarbonates have been used as a substitute, but it is found that these materials are prone to attack by impurities that may be found in industrial pressure air supplies. There are known composite constructions that avoid these disadvantages by providing a tubular sight glass mounted on a mainly metal construction, but these are relatively complex to produce and assemble, with consequently high costs, and generally require a number of separate seals giving an increased risk of leakage under pressure. There are also flat-pane sight glasses known, but these are also relatively complex to produce and assemble. Because the glass must be secured detachably if it is to be replaced without difficulty should it become broken, there is the risk of leakage past its sealing means as it will generally be secured by screws at spaced intervals around its periphery.

According to the present invention, there is provided a fluid container provided with a sight glass for indicating the fluid level therein, said sight glass being provided by an elongate light-transmitting member tapered along its length and slidable into and sealingly fitting a tapered receiving opening formed as a slot or recess in a side of the container.

In such an arrangement a sealing ring may be interposed between the sight glass and the adjoining surface of the container to encompass a wall area of the container containing at least one communicating opening in said wall to the container interior at regions adjacent both the top and the bottom of said sight glass member.

Preferably the sight glass member is insertable in said slot or recess from the top and means are arranged to be disposed above said member to limit or prevent upwards displacement of the member.

Assembly is facilitated if the sight glass member and said slot or recess are tapered both in their width and their depth transverse to the main dimension of the elongate sight glass member, i.e. transversely to the direction of insertion.

Stop means may be provided at one end of the slot or recess to limit the insertion of the sight glass member therein, and this can be conveniently achieved with a slot or recess comprising a U-form flange, the bottom of which provides said stop means.

The invention will be described in more detail with reference to an embodiment illustrated in the accompanying drawings.

BRIEF DESCRIPTION OF THE DRAWINGS

FIG. 2 is a side view in the direction A in FIG. 1 of the filter bowl and sight glass, FIG. 3 is a rear view of the sight glass with its sealing ring, FIG. 3a is a cross-section of the sight glass in a horizontal plane also illustrating a float element therein, and FIG. 4 illustrates a filter-regulator-lubricator unit in which both the filter and the lubricator have bowls with a sight glass and a quick-release locking arrangement of the form shown in the preceding figures.

DESCRIPTION OF THE PREFERRED EMBODIMENT

Figure 1:
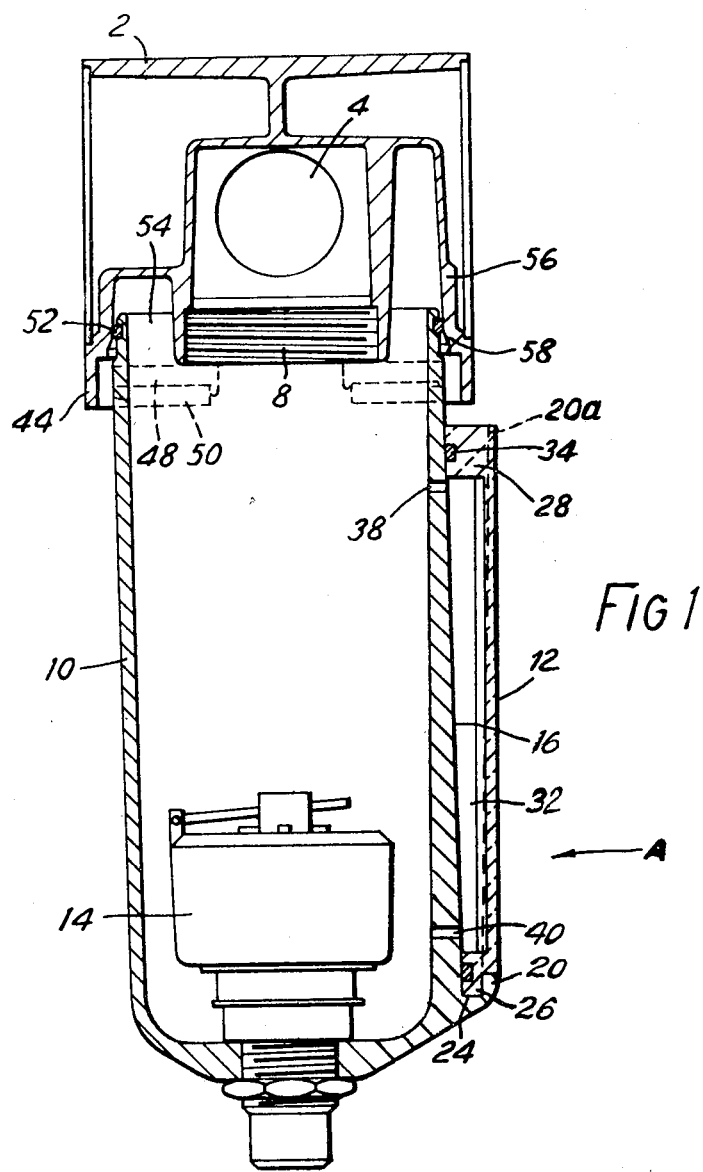
FIG. 1 is a central vertical section through a filter incorporating the invention.

The filter comprises a die-cast body 2 provided with coaxial inlet and outlet ports (only one port 4 is shown) that communicate with a conventional filtration arrangement (not shown for the sake of clarity) attached to screwed boss 8 of the body and disposed within a dependent bowl 10 detachably held in the head by a quick-release locking arrangement described in a co-pending application filed simultaneously herewith (based on UK patent application No. 80.28833). The bowl itself comprises a metal die-casting in which there is mounted a sight glass 12 showing the liquid level within the bowl, and an automatic dump valve 14 for draining the bowl.

The bowl generally has a cylindrical form, tapering slightly downwardly. At one side, a flat wall portion 16 is formed extending from the top of the bowl nearly to its bottom and an integrally formed L-section flange 18 standing proud of this wall portion extends around its bottom region and along its lateral edges to a level close to the top of the bowl. The two main lengths of the flange at the opposite lateral edges of the flat wall portion define an elongate slot or recess 24, closed at the bottom by the lowermost portion of the flange. The two main lengths of the flange diverge slightly in the upward direction as can be seen in FIG. 2. The flange comprises an outer lip 20 having a planar outer face radially of the bowl but tapering in thickness towards its upper end as can be seen from the broken line 20a indicating its inner face, and at a slightly diverging spacing from the flat wall portion 16 in this same upward direction, as can also be seen in FIG, 1. The lip 20 thus forms a channel-like margin to the borders of the U-form recess 24 between the flange outer lip and the flat wall portion, the height of which recess radially of the bowl increases with the divergence of the flange lip from the wall portion 16, while the width of the U-form recess 24 similarly increases with distance from the bottom of the bowl, due to the divergence of the upwardly extending main lengths of the flange.

The opening defined by the channeled recess 24 is used to secure the sight glass 12 of moulded glass or other transparent or translucent material, an integral lip or rim 26 extending around the side and bottom edges of the sight glass having a form complementary to that of the channel-like margin of the recess and fitting under the flange outer lip 20. The sight glass includes a thickened top portion 28, the rear face of which is coplanar with the rear face of the lip 26, and a ridged central portion 30 between the laterally opposite portions of the lip 26 that has its outer face substantially flush with the outer face of the flange lip 20. The sight glass thus defines a trough-like internal space 32 closed at the rear or radially inner face by the flat wall portion 16 of the bowl. Within the space 32 there can be provided a float element 33 that can move freely up and down the sight glass to indicate the liquid level in the space.

An O-ring 34 is seated in a recess 36 in the rear face of the lip 26 and top portion 28 of the sight glass to seal the space 32, and spaced apertures 38, 40 in the wall portion 16 adjacent to the top and bottom of the space communicate with the main interior space of the bowl (a single elongate aperture can serve the same purpose). The O-ring can be a standard circular-form ring that is pulled into the elongate shape required to match the recess 36, but that then fits the recess without being under tension.

Because of the upwardly widening space between the main lengths of the flange 18 and of the corresponding increasing spacing of the flange lip from the bowl flat wall portion, with the bowl removed from the filter body the sight glass can be easily slid into the recess from the top with an initial radial and lateral play or clearance. After the glass has moved down some two thirds of the length of the flange, the radial play has been taken up and the O-ring 34 begins to be urged against the flat wall portion 16. The compression force on it increases with continued movement so that it is in an operative state for effective sealing as the sight glass is pushed further down. When the sight glass is pushed fully home to the position shown in FIGS. 1 and 2 to abut against the bottom portion of the flange 18, there is a significant frictional effect from the compression force on the O-ring that resists upwards displacement of the sight glass.

When the bowl is secured to the filter body, the top of the sight glass is immediately below and only slightly spaced from the bottom skirt 44 of the body. If there should be any tendency of the sight glass to lift in use, e.g. due to a combination of internal fluid pressure forces and vibration, it is only able to move to a very limited extent before it abuts against the rim. This ensures that the O-ring will remain securely engaged between the sight glass and the bowl flat wall portion to act as an effective seal, and also that both apertures 38, 40 remain in communication with the sight glass internal space 32 so that false readings will not be obtained.

The bowl is held in the body by two interengaging series of oblong lugs 48, 50, that are respectively on the bowl outer periphery adjacent its top rim 54 and on the inner face of cylindrical bottom lip of the body. The bowl top rim carries an O-ring 52 that is urged against an inner peripheral sealing face 56 within the body when the bowl lugs and the body lugs are engaged, as shown in FIG. 1. The cylindrical sealing face is preceded by a tapered lead-in face 58 below it to guide the sealing ring into place. The manner in which these act to hold the bowl is described in more detail in the co-pending application referred to above.

The angular orientation of bowl on the body, and therefore the position of the sight glass 12, is determined by the lugs 48, 50, and with four equispaced lugs in each series the bowl can be assembled on the body in any of four alternative angular orientations at 90° intervals. Other alternatives are possible with different numbers of lugs.

Although the invention has been exemplified in the foregoing description by reference to a pressure air filter, it may be employed analogously in other fluid flow devices, such as in a pressure air lubricator, as is schematically shown in FIG. 4 in a composite assembly for a pressure air supply line, comprising a filter 82, pressure regulator 84 and lubricator 86. The bowls 88 of the filter and lubricator each have sight glasses of the form described above and are interengaged with the bodies of the filter and lubricator respectively by the locking lugs described above. The filter 82 differs from that described earlier in that it has a manual drain valve 90.

For assembly, the units have wedge-form recesses (not shown) on opposite end faces containing their inlet and outlet porting, for engagement by complementary wedge-form elements on connector members 92, 94. The connector members 92 have wedge-form elements on opposite end faces to connect together two treatment devices, while the members 94 have screw connection means for engagement with the inlet and output piping.

What is claimed is:

1. A fluid container having a bowl and an attached overhanging cap, the bowl defining a vessel including a flat, generally vertical sidewall portion surrounded, except at its upper end, by a flanged lip defining a receiving opening, the lip being tapered slightly away from the flat vertical sidewall portion as the upper end of the receiving opening is approached, and an elongate light-transmitting sight glass member having a trough-like internal space extending centrally of its width along its length except adjacent its ends, the flat vertical sidewall portion being formed with at least one passage into the bowl aligned with the trough, the sight glass member having a peripheral rim, thickening as its upper end is approached and resilient sealing means disposed on the sight glass member rim, the sight glass peripheral rim being held by the flanged lip in frictional and sealing engagement against the flat vertical sidewall portion whereby the frictional engagement of the sealing means against the flat vertical sidewall portion holds the sight glass member firmly against any undesired upward movement without the use of fasteners.

2. A container as claimed in claim 1 wherein both the receiving opening and the sight glass member are tapered in width, becoming correspondingly wider as their upper ends are approached.

3. A container as claimed in claim 1 wherein the sealing means comprises a recess about the sides of the rim adjacent the flat, vertical sidewall portion and an O-ring disposed in the recess.

4. A container as claimed in claim 1 wherein the overhanging cap blocks upward movement of the sight glass member.

* * * * *